(12) United States Patent
Snoeren et al.

(10) Patent No.: US 7,668,358 B2
(45) Date of Patent: Feb. 23, 2010

(54) MODEL-BASED GRAYSCALE REGISTRATION OF MEDICAL IMAGES

(75) Inventors: Peter R. Snoeren, Gouda (NL); Nico Karssemeijer, Beek (NL)

(73) Assignee: Hologic, Inc., Marlborough, MA (US)

( * ) Notice: Subject to any disclaimer, the term of this patent is extended or adjusted under 35 U.S.C. 154(b) by 834 days.

(21) Appl. No.: 10/623,191

(22) Filed: Jul. 18, 2003

(65) Prior Publication Data

US 2005/0013471 A1    Jan. 20, 2005

(51) Int. Cl.
G06K 9/00    (2006.01)
(52) U.S. Cl. .................................. 382/131; 382/151
(58) Field of Classification Search ................. 382/131
See application file for complete search history.

(56) References Cited

U.S. PATENT DOCUMENTS

| | | | |
|---|---|---|---|
| 5,133,020 A * | 7/1992 | Giger et al. ................. | 382/128 |
| 5,224,177 A * | 6/1993 | Doi et al. .................... | 382/168 |
| 5,481,480 A * | 1/1996 | Green et al. ................ | 700/293 |
| 5,537,485 A * | 7/1996 | Nishikawa et al. .......... | 382/130 |
| 5,544,256 A * | 8/1996 | Brecher et al. ............. | 382/149 |
| 5,598,185 A | 1/1997 | Holmgren | |
| 5,627,907 A | 5/1997 | Gur et al. | |
| 5,644,649 A | 7/1997 | Schoeters et al. | |
| 5,644,650 A | 7/1997 | Suzuki et al. | |
| 5,657,362 A * | 8/1997 | Giger et al. ................. | 378/37 |
| 5,729,620 A | 3/1998 | Wang | |
| 5,748,173 A | 5/1998 | Gur | |
| 5,768,333 A | 6/1998 | Abdel-Mottaleb | |
| 5,815,591 A | 9/1998 | Roehrig et al. | |
| 5,828,774 A | 10/1998 | Wang | |
| 5,854,851 A | 12/1998 | Bamberger et al. | |
| 5,917,929 A | 6/1999 | Marshall et al. | |
| 5,970,164 A | 10/1999 | Bamberger et al. | |
| 5,982,917 A | 11/1999 | Clarke et al. | |
| 5,987,345 A | 11/1999 | Engelmann et al. | |
| 6,014,452 A | 1/2000 | Zhang et al. | |
| 6,035,056 A | 3/2000 | Karssemeijer | |
| 6,075,879 A | 6/2000 | Roehrig et al. | |
| 6,185,320 B1 | 2/2001 | Bick et al. | |
| 6,198,838 B1 | 3/2001 | Roehrig et al. | |
| 6,243,095 B1 | 6/2001 | Shile et al. | |
| 6,263,092 B1 | 7/2001 | Roehrig et al. | |
| 6,266,435 B1 | 7/2001 | Wang | |
| 6,301,378 B1 | 10/2001 | Karssemeijer et al. | |
| 6,404,908 B1 | 6/2002 | Schneider et al. | |
| 2002/0097902 A1 | 7/2002 | Roehrig et al. | |

* cited by examiner

*Primary Examiner*—Bhavesh M Mehta
*Assistant Examiner*—David P Rashid
(74) *Attorney, Agent, or Firm*—Brian J. Daiuto

(57) ABSTRACT

Numerical image processing based on a model of medical image acquisition of two or more medical images to provide grayscale registration is described. The grayscale registered temporal images may then be displayed for visual comparison and/or further processed by a computer-aided diagnosis system for detection of medical abnormalities therein. A parametric method includes spatially registering two images and performing gray scale registration of the images. A parametric transform model, e.g., analog to analog, digital to digital, analog to digital, or digital to analog model, is selected based on the image acquisition method(s) of the images, i.e., digital or analog/film. Gray scale registration involves generating a joint pixel value histogram from the two images, statistically fitting parameters of the transform model to the joint histogram, generating a lookup table, and using the lookup table to transform and register pixel values of one image to the pixel values of the other image.

35 Claims, 10 Drawing Sheets

Digital -> Analog

Analog -> Analog

Analog to Digital

Analog to Analog

MODEL-BASED GRAYSCALE REGISTRATION OF MEDICAL IMAGES

CROSS REFERENCE TO RELATED APPLICATION

The subject matter of this application is generally related to the subject matter of commonly assigned, U.S. patent application Ser. No. 10/622,978, entitled "Facilitating Computer-Aided Diagnosis, Comparison, And/Or Display Of Medical Images" and filed concurrently on Jul. 18, 2003, which was published on Oct. 28, 2004 as US2004/0213447A1, the entirety of which is incorporated herein by reference.

BACKGROUND OF THE INVENTION

1. Field of the Invention

This patent specification relates generally to display and/or computer aided diagnosis (CAD) of medical images. More specifically, methods and systems grayscale registration of two or more medical images such as mammograms for facilitating visual comparison thereof and enhancing the speed and reliability of CAD detection of medical abnormalities are disclosed.

2. Description of Related Art

Systems for computer-aided diagnosis ("CAD") assist radiologists in the detection and classification of abnormal lesions in medical images. The purpose of such devices, as described in U.S. Pat. No. 5,815,591 entitled "Method and Apparatus for Fast Detection of Spiculated Lesions in Digital Mammograms" and issued on Sep. 29, 1998 to Roehrig, et. al., the entirety of which is hereby incorporated by reference herein, is to direct the attention of a radiologist to suspicious areas of the medical image that may reflect a threatening condition. While not a replacement for the experienced radiologist, CAD systems are designed to increase efficiency and reduce error, as a typical radiologist may be required to examine hundreds of medical images per day, which can lead to the possibility of a missed diagnosis due to human error.

Desired characteristics of a CAD system for analyzing medical images such as mammograms include high speed (requiring less processing time), high sensitivity or precision (the ability to detect more subtle indications of abnormalities), and/or high accuracy (lower false positives, i.e., the number of areas marked "suspicious" by the CAD system which, in reality, are not suspicious or indicative of a possibly cancerous condition and lower false negatives, also called "misses"). It is noted that although "mammogram" is sometimes used in the art to depict a set of four related films or views but sometimes used to depict one such view, for clarity purposes, the term "mammogram" shall correspond to one of the related films or views taken during the mammography process.

Most commercial CAD systems today generally usually treat each digital medical image separately. In these CAD systems, the plurality of digital or digitized medical images are processed separately by the CAD system for detecting suspicious lesions. However, in radiology practice it is often useful to compare similar medical image views taken at different times and temporal comparisons may form an important part of the diagnostic procedure. Temporal comparisons can be made to detect interval changes indicating lesion growth, to monitor progression of a disease, and/or to estimate the effect of treatment.

One area where temporal comparison of medical images plays a major role is breast cancer screening using mammography. For example, if a breast develops a potentially suspicious lesion over a period of time as reflected by periodic mammograms of that breast, such as every twelve months, the likelihood increases that it is a true lesion. Studies have shown that the use of prior mammograms in screening effectively reduces the number of false positive referrals. See for example, Thurfjell, M. G., Vitak, B., Azavedo E., Svane G., Thurfjell E., "Effect on Sensitivity and Specificity of Mammography Screening With or Without Comparison of Old Mammograms," ACTA Radiologica, 41(1) (2000) 52-56; and Burnside, E. S., Sickles, E. A., Sohlich R. E., Dee K. E., "Differential Value of Comparison With Previous Examinations in Diagnostic Versus Screening Mammography," American Journal of Roentgenology, 179(5) (2002) 1173-1177, the entireties of which are incorporated by reference herein. This results from the fact that the use of prior mammograms allows radiologists to distinguish lesions that grow from normal dense structures in the breast that somehow look suspicious. Temporal comparison of mammograms in a CAD system is described in U.S. Pat. No. 6,075,879 to Roehrig et. al, which is incorporated by reference herein.

Breast cancer in women is a serious health problem, the American Cancer Society currently estimating that over 180,000 U.S. women are diagnosed with breast cancer each year. Breast cancer is the second major cause of cancer death among women, the American Cancer Society also estimating that breast cancer causes the death of over 44,000 U.S. women each year. While at present there is no means for preventing breast cancer, early detection of the disease prolongs life expectancy and decreases the likelihood of the need for a total mastectomy.

Currently, mammography using x-rays is the most common method of detecting and analyzing breast lesions. The current trend, however, is toward digital mammography. In the Netherlands, for example, where a nation-wide breast cancer screening program is implemented, about two million women in the 50 to 75 age group are invited once every two years for screening mammography. With an attendance of 80%, about 800,000 women have a screening mammography every year. It is expected that within the next few years all screening units in the country will convert to digital mammography. During a two year transition period, digital mammograms will need to be read in combination with the prior film-screen mammograms. Currently, it is expected that all most recent prior film-screen mammograms will be digitized to allow soft-copy reading.

Sometimes, temporal images are subtracted to enhance areas where differences occur. However, in conventional radiology the review of temporal image pairs may be seriously hampered by differences in acquisition. To some extent, positioning changes can be dealt with by geometric registration algorithms, the development of which received a lot of attention in recent years. See for example, Sallam, M. Y., Bowyer, K. W., "Registration and Difference Analysis of Corresponding Mammogram Images, Medical Image Analysis," 3(2) (1999) 103-118; and Wirth, M. A., Narhan, J., Gray, D., "Non-Rigid Mammogram Registration Using Mutual Information," Proc. SPIE Medical Imaging 2002: Image Processing, vol 4684 (2002) 562-573, the entireties of which are incorporated by reference herein.

The differences in acquisition are generally attributed to changes in exposure and to different screen-film imaging and/or digital imaging systems. These differences may cause subsequent mammograms to appear dramatically different and thus reduce the effectiveness of temporal comparisons. Thus, for example, when visually comparing a current-year mammogram to a prior-year mammogram on a softcopy display, a radiologist can have difficulty detecting subtle anatomical differences between the mammograms, because their different acquisition parameters can make them "look" very different in terms of grayscale levels. These differences may not be easily normalized as they may induce non-linear gray scale changes. Although radiologists may adjust the relative contrast, brightness and/or position of the threshold of the S-curve (the HD-curve, named after Hurter and Driffeld) of one or more images, such a process can be inaccurate, tedious, annoying, and time-consuming and may reduce performance and induce human errors. In other words, these acquisition differences cannot be easily or quickly corrected by the radiologists during display. In addition to negatively affecting visual comparison thereof, differences in grayscale settings/parameters between two temporally distinct mammograms of the same breast can be a disadvantage for temporal comparisons thereof in a CAD system, such as that described in U.S. Pat. No. 6,075,879 supra.

Accordingly, it would be desirable to facilitate visual comparison of two or more mammograms of a breast taken at different times and/or under different acquisition conditions.

It would be further desirable to provide a computer-aided diagnosis (CAD) system that can effectively use information from multiple digital or digitized medical images, including sets taken at different times and/or under different acquisition parameters, to detect anatomical abnormalities therein. In a mammography setting, the multiple mammograms would be of the same or similar mammogram view of the same patient.

SUMMARY OF THE INVENTION

According to a preferred embodiment, numerical image processing algorithms are performed on two or more medical images to provide grayscale registration thereof, the numerical image processing algorithms being based at least in part on a model of medical image acquisition. The grayscale registered temporal images may then be displayed and/or further processed for comparison thereof. Methods and systems grayscale registration of two or more medical images such as mammograms for facilitating visual comparison thereof and enhancing the speed and reliability of CAD detection of medical abnormalities are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

As is evident, the parameter-based method for grayscale registration of one image to another image uses information in those images and the image acquisition method of each image. The image acquisition method of each image is used in order to select the appropriate parametric transform model from a set of predetermined parametric transform models. The method includes spatially registering the two images and performing gray scale registration. The gray scale registration involves generating a transform lookup table and using the transform lookup table to transform and register pixel values of one image to the pixel values of the other image. To generate the transform lookup table, a joint histogram may be generated from the two images and parameters of the predetermined parametric transform model are statistically fit to the joint histogram.

The various acquisition models described herein take into account many of the most relevant steps in the image acquisition that influence pixel value differences between images. The parameter-based model provides a transform function or lookup table $T_{A,B}(g_A)$ to transform or register pixel values in one image to those on another image. The methods are particularly suited for temporal comparisons of medical images such as mammograms. In addition, the transformation facilitates comparison of analog with digital images, i.e., combinations of unprocessed digital and digitized film-based mammograms by a radiologist. The method is based on a model of acquisition, which makes it relatively unsusceptible to differences between the images that are not due to acquisition, while other differences do not greatly affect the quality of transformed images negatively.

The method enables a radiologist to make quick, effective and efficient temporal comparisons of medical images and thus requiring fewer manual and subjective adjustments to be made by the radiologist for optimal display of the mammograms. In addition or alternative to image display, the transformation method may also be used for computer aided detection methods that make use of temporal other comparative information.

According to one preferred embodiment, a method for registering a first image to a second image generally includes spatially registering the first image and the second image relative to each other, generating at least one pixel value histogram based on pixel values of the first and second images, generating a lookup table based on the at least one pixel value histogram, a first image acquisition method for the first image and a second image acquisition method for the second image, and applying the lookup table to the pixel values of the first image to generate a third image, the third image being transformed from the first image and registered to the second image. Preferably, the histogram is a joint histogram of the first and second images and the predetermined parametric transform functions are one-dimensional monotonic functions.

Spatial registration may include segmenting the breast or other target from the rest of the image, geometric registration (e.g., translating, rotating, shearing and/or scaling), and cropping the images so that only images of the target in both the first and second images remain. The cropped images are used to generate that histogram.

According to another preferred embodiment, a method for registering a first image to a second image generally includes generating a joint pixel value histogram using pixel values of the first and second images, selecting a parametric transform function from a plurality of predetermined parametric transform functions, the selecting being based on a first image acquisition method for the first image and a second image acquisition method for the second image, and statistically fitting parameters of the selected parametric transform function to the joint pixel value histogram, the statistically fitting determines the values of the parameters.

According to yet another preferred embodiment, a system for registering a first image to a second image generally includes an input for receiving data for the first and second images and a processor configured to generate a joint pixel value histogram using pixel values of the first and second images, select a parametric transform function from a plurality of predetermined parametric transform functions based on a first image acquisition method for the first image and a second image acquisition method for the second image, and statistically fit parameters of the selected parametric transform function to the joint histogram to determine the values of the parameters.

According to yet another preferred embodiment, a computer program product for directing a computing apparatus to automatically register two medical images are provided to implemented the grayscale image registration methods.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

FIGS. 13A-13D illustrate an example of an analog to digital transformation in which FIGS. 13A and 13B are input images, FIG. 13C shows a transformed image, and FIG. 13D contains the scatter plot of pixel-values together with a plot of the parametric model.

FIGS. 14A-14D illustrate an example of an analog to analog transformation in which FIGS. 14A and 14B are input images, FIG. 14C shows transformed image, and FIG. 14D contains the scatter plot of pixel-values together with a plot of the parametric model.

DESCRIPTION OF SPECIFIC EMBODIMENTS

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1A:
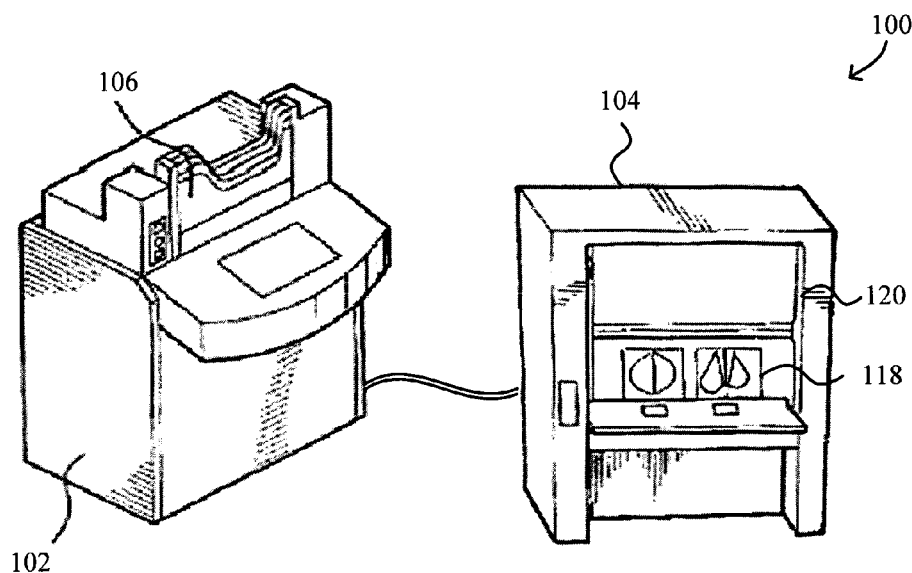
FIG. 1A shows an outside view of a computer aided diagnostic (CAD) system.

FIG. 1A shows an outside view of a computer aided diagnostic (CAD) system 100, such as an IMAGE CHECKER M1000 from R2 Technology, Inc., for assisting in the identification of suspicious lesions in medical images such as mammograms. CAD system 100 generally includes a CAD processing unit 102 and a viewing station 104. The CAD processing unit 102 may scan and digitize an x-ray image, such as a developed x-ray mammogram 106, into a digital image and/or receive a digital image as input. According to a preferred embodiment, the CAD processing unit 102 receives at least two mammogram images of a same or similar view of the same breast, e.g., the craniocaudal (CC) or the mediolateral oblique (MLO) view, taken at different times in order to facilitate comparison of multiple medical images. The CAD processing unit 102 then processes the digitized and/or digital images to register the images relative to each other and outputs grayscale registered digital images for viewing at the viewing station 104. Additionally or alternatively, the CAD processing unit 102 may perform image processing steps to process at least one of the grayscale registered digital image in order to display a highlighted digital image having information directing the attention of the radiologist to suspicious areas. Preferably, the image process steps takes into account a comparison of the multiple medical images.

Figure 1B:
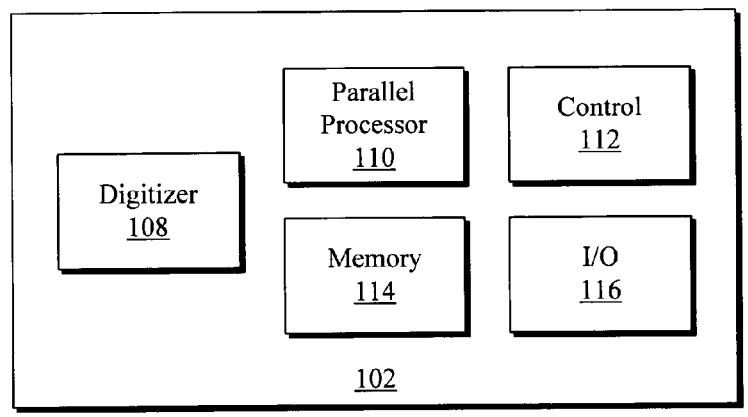
FIG. 1B is a block diagram of a CAD processing unit of the CAD system.

FIG. 1B is a block diagram illustrating the CAD processing unit 102 in more detail. The CAD processing unit 102 generally includes a digitizer 108, such as a laser scanner with 50 micron resolution, for digitizing the developed image 106 such as a developed x-ray mammogram. The CAD processing unit 102 generally also includes elements necessary for performing image processing including parallel processing steps. In particular, CAD processing unit 102 may also include elements such as a parallel processing unit 110, a central control unit 112, a memory 114, and an I/O unit 116. It is to be appreciated that the parallel processing unit 110 shown in FIG. 1B may be replaced by a single processor without departing from the scope of the preferred embodiments. It is to be further appreciated that in addition to the grayscale registration algorithms disclosed herein, the parallel processing unit 102 is capable of performing a multiplicity of other image processing algorithms.

Referring again to FIG. 1A, the viewing station 104 is preferably configured to allow the radiologist to conveniently view both the x-ray mammogram 106 and the output of the CAD processing unit 102 on a display device 118. The display device 118 may be, for example, a CRT screen. The display device 118 typically displays grayscale registered digital mammogram that may be optionally highlighted with information to direct the attention of the radiologist to suspicious areas as determined by image processing steps performed by the CAD processing unit 102. The viewing station 104 may also include a station 120 for viewing the actual x-ray mammogram 106 and/or the actual digital mammogram itself, i.e., without grayscale registration and without highlighting. The radiologist is assisted by the CAD system 100 by viewing the display device 118, which then facilitates comparison of multiple mammograms, such as a temporal comparison or a comparison of images of the left and right breast of a patient. The comparison helps with the detection by the radiologist of suspicious portions of the actual x-ray or digital mammogram itself. Further information regarding CAD system 100 may be found in U.S. Pat. No. 5,815,591.

The display device 118 of the viewing station 104 preferably displays at least two grayscale registered images of a same or similar view of one breast taken at different times in order to facilitate temporal comparison. It is noted that the CAD system 100 may also be used in accordance with the preferred embodiments to simultaneously display information relating to multiple views of the same breast, similar views of opposing breasts, and/or views of a single breast taken at different points in time. Thus, after grayscale registration, the radiologist may better make comparisons. The CAD system 100 may optionally further process the images to highlight specific areas of one or both of the mammogram images.

Note that although the preferred embodiments are described herein with respect to detection systems that process and analyze mammography x-ray films and mammography digital images, the present invention is readily adaptable to many other types of CAD systems. The present invention may be applicable to CAD systems that process and optionally analyze any type of film-based or digital-based medical images. For example, other X-ray imaging devices, ultrasound imaging, magnetic resonance imaging (MRI), computed tomography (CT) imaging, positron emission tomography (PET), scintillation camera imaging, and nuclear imaging all produce images that may be film- or digital-based. Additionally, film-based medical images are carried on a wide variety of film-like materials such as vellum or any other transparent or translucent media.

Although the description herein illustrates the registration of a first image to a second image, the method may be further applied to register additional images to the second image, e.g., to facilitate comparison of mammogram images from the current year, one year prior, and two years prior, etc. In one preferred embodiment, the grayscale image registration method is applied to temporal mammograms, e.g., from two screening rounds. Alternatively, the multiple related medical images may correspond to two views of the same breast, to similar views of two opposing breasts, e.g., the MLO view of the left and right breast of a single subject. In yet another embodiment, there are more than two related mammograms wherein the first two are of the same view, e.g., the CC view, of the left and right breasts, and the others are of the same view of the left and/or right breast from one or more prior screenings. Generally, the images to be registered are of the same or similar view and can be of different (left and right) breast and/or taken at different times. It is to be appreciated that there are further combinations of the above mammograms to be input into the CAD processing unit that are within the scope of the preferred embodiments. It is to be further appreciated that the historical mammogram that was taken months or years earlier may be stored in digitized form in CAD memory 114, or other digital storage medium, without departing from the scope of the preferred embodiments. Indeed, the CAD memory 114 or other storage medium may contain an entire historical archive of prior digital mammograms taken of the same patient, and CAD processing unit may be modified to compare any of these historical digital mammograms of the same view derived therefrom to the current digital mammogram.

One reason to match or register multiple mammograms is to lessen the irrelevant differences between images due to acquisition. These differences may be attributable to variations in breast compression, exposure time, incident radiation intensity, and either film properties and digitization for screen-film mammograms or detector response for unprocessed digital mammograms. The grayscale registration method described herein could help reduce the radiologist's efforts to detect relevant differences like abnormal growth in breast tissue that signals breast cancer. In addition, the grayscale registration method may also be applicable in subtraction radiology and/or in the computer aided detection of abnormalities in temporal or other comparative mammograms.

The grayscale registration method utilizes histogram matching. Histogram matching generally refers to methods that match images with the same or similar content by adjusting look-up tables of pixel values. Conventional histogram matching is typically a one-dimensional process. In general, histogram matching methods can be classified as (1) non-parametric methods that attempt to find tuples of gray values that match as closely as possible or (2) parametric methods that require the estimation of parameters. Conventional parametric methods are ad hoc and often based on simple polynomial functions.

The grayscale image registration method according to a preferred embodiment utilizes a parametric technique to match the pixel value distributions of two mammograms of the same patient. In contrast to the conventional ad hoc parametric matching methods, the parametric grayscale registration method of the preferred embodiment is derived from an understanding as to why the value of a pixel is different in different images so as to match two images in a more "natural" way. In other words, instead of arbitrarily shifting and/or scaling the pixel values of one image to match the other or directly mapping one histogram to the other, the parametric grayscale image registration method models differences in acquisition of the images. These acquisition differences may include variations in (1) breast compression; (2) exposure time; (3) incident radiation intensity; and, (4a) film properties and digitization for screen-film mammograms, or (4b) detector response for unprocessed digital mammograms. The method of transformation being based on a model of acquisition allows more natural and accurate registration of pixel values than conventional ad hoc registration methods.

By modeling the acquisition differences, an objective transformation between the two screen-film images is determined. One key advantage of this parametric method is that many unknown acquisition parameters in the model cancel out to result in a parametric model with fewer degrees of freedom which need to be estimated or otherwise fitted from the pixel value distributions of the two images themselves. As a result, the method does not require a priori knowledge of specific settings of acquisition to match histograms and the separate acquisition parameters of sub-models are not retrievable from the fitted parameters. In addition, by having to estimate or fit only a few remaining degrees of freedom, the parametric method is more stable and reliable. With the parametric method, it is possible to match digitized screen-film mammograms (also referred to herein as analog mammograms) as well as unprocessed digital mammograms in any of the four possible combinations: analog to analog, analog to digital, digital to analog, and digital to digital.

Figure 2:
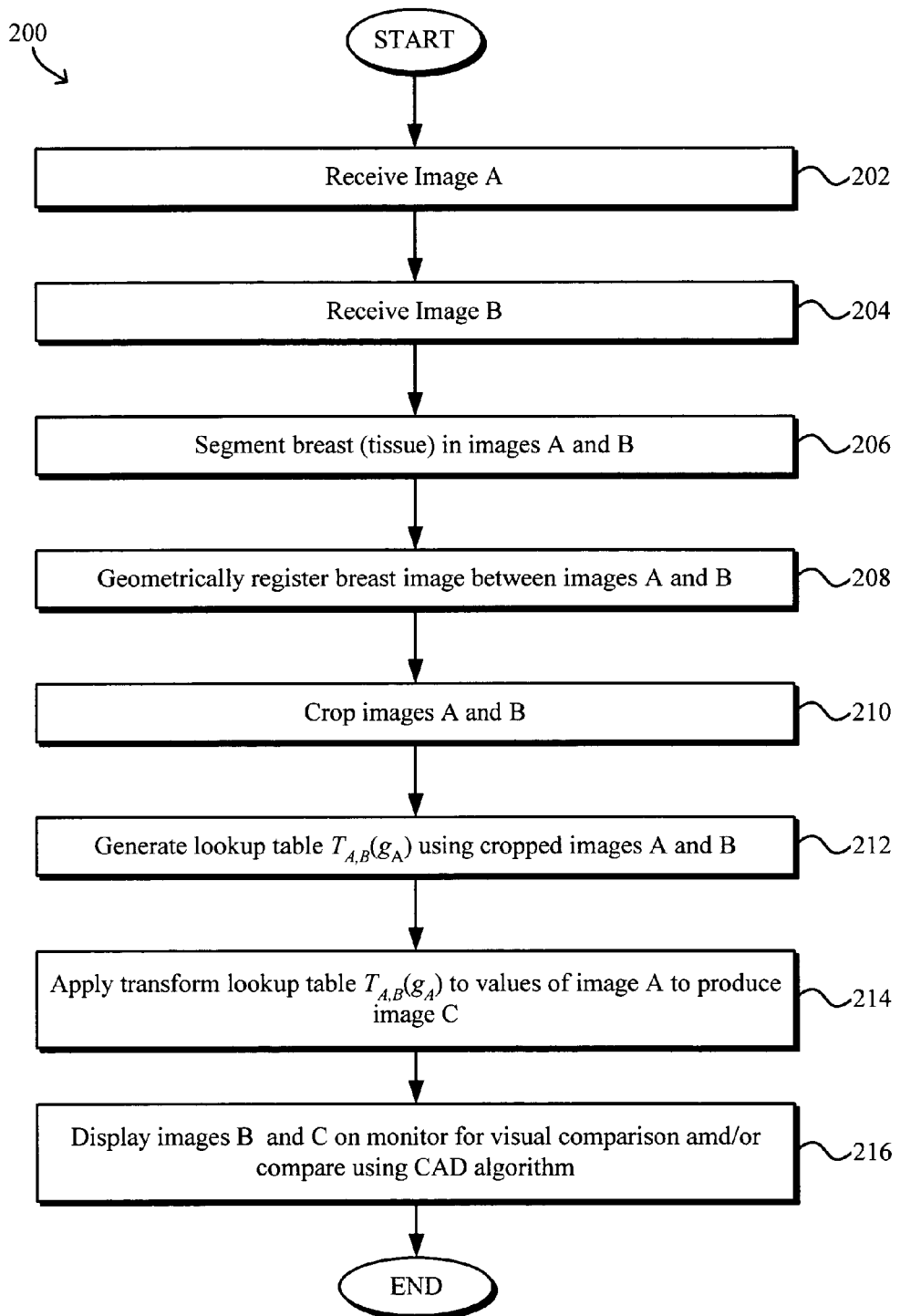
FIG. 2 is a flowchart illustrating an overall parametric grayscale registration process performed by the CAD system for model-based grayscale registration of two images.

FIG. 2 is a flowchart illustrating an overall parametric grayscale registration process 200 performed by the CAD processing unit 102 on two images. As noted above, the two images may be images that were taken at different times to facilitate temporal comparison of the images. The two images may also be images of the same view of the left and right breasts taken at the same or different times. The CAD system receives image A at step 202 and image B at step 204. The images may be any combination of digital and analog images, e.g., two digital images, two analog images, or an analog and a digital image. For example, where the received image is an x-ray image, such as a developed x-ray mammogram, the CAD system may additionally digitize the received analog image. As another example, the CAD system may directly receive an unprocessed digital mammogram as the input image.

Next, pre-processing geometric registration steps 206-210 are performed. Geometric registration ensures that the histograms generated from the images to be matched are based on the same tissue as much as possible. If this is not true, for example, if in one image the pectoral muscle is visible and in the other image it is not, then the histograms would not be correctly matched. Similarly, if in one image a larger part of the background is visible than in the other image, then histogram matching would have no significance.

In particular, at step 206, the breast (tissue) in images A and B are segmented so that the pectoral muscle and background portions of the images are removed and only the breast (tissue) remains. The breast (or other target tissue) portions of the images are then geometrically registered at step 208. Geometric registration is achieved by global translation in x and y directions, rotation, scaling, and shearing as these parameters are generally at least slightly different between the images of the breast in the images A and B. Geometric registration is preferably achieved by optimization of the entropy correlation coefficient, i.e., normalized mutual information, as disclosed in Maes, F., Collignon, A., Vandermeulen, D., Marchal, G., Suetens, P., "Multimodality Image registration by Maximisation of Mutual Information," IEEE Transactions on Medical Imaging, 16(2) (1997) 187-198, the entirety of which is incorporated by reference herein. In one illustrative implementation, the pixel value range is down-sampled to 6-bits and the pixel value histograms are equalized before registration for faster processing. The entropy correlation coefficient can be subsequently optimized on a 64×64 grid of pixel value combinations. After a first pass on the (segmented) tissue area, a second pass can be made on the corresponding regions with tissue for fine-tuning. After geometric registration in step 208, the images are preferably cropped at step 210 so that only tissue that is visible in both images is taken into account in the histograms. The step may involve cropping some of the image of the breast (target) where one image includes more of the target than the other image. Once the pixel value transformation between the two images is determined, then preferably the entire (uncropped) image A is matched to image B (or vice versa).

In order to find corresponding tissue in the images, precise geometric registration is generally not required. Finding a rough outline typically is sufficient for the purpose of finding corresponding tissue in the images. However, if histograms are matched by an entire parametric model rather than a restricted parametric model (as will be discussed infra), a pixel-to-pixel correspondence is desired, making geometric registration a more important component of histogram matching. The demands for precise geometric registration would be higher in subtraction radiology but affine transformations are sufficient as a pre-processing step for gray scale registration. Non-rigid registration of the images may be employed for more precise results.

It is noted that steps 206-210 are merely illustrative pre-processing geometric registration steps. Variations to steps 206-210 may be implemented. For example, where the images are of the same view of the left and right breasts, the one image may be flipped or mirrored to facilitate spatial and grayscale registration processing. After the grayscale transformation is complete, the mirrored image may be converted to the original configuration for display to the radiologist.

Next, at step 212, a lookup table or transformation function $T_{A,B}(g_A)$ is generated using the pixel values of the cropped images A and B. The lookup table $T_{A,B}(g)$ maps a pixel value in image A to a pixel value in image B. As is evident, a lookup table $T_{B,A}(g)$ for mapping in the reverse direction, i.e., for mapping a pixel value in image B to a pixel value in image A, can also be determined using similar modeling and methods. The generation of the transformation function $T_{A,B}(g_A)$ will be described in more detail below.

At step 214, the transform lookup table $T_{A,B}(g)$ is applied to values of image A to produce image C so that the image A is registered in grayscale to image B. Portions of the process 200 may be repeated where more than two images are to be compared. The additional images are preferably registered to the same image, i.e., image B. At step 216, images B and C can be simultaneously displayed on a monitor for visual comparison such as by a radiologist. Alternatively or additionally, the CAD system may further perform image processing steps to compare images B and C so as to highlight information in at least one of the images B and C, preferably at least the more current image, in order to direct the attention of the radiologist to any suspicious areas. Such temporal comparisons can be carried out by the CAD system as described in U.S. Pat. No. 6,075,879 entitled "Method and System for Computer-Aided Lesion Detection Using Information From Multiple Images" and issued on Jun. 13, 2002 to Roehrig et al., the entirety of which is incorporated by reference herein.

Figure 3:
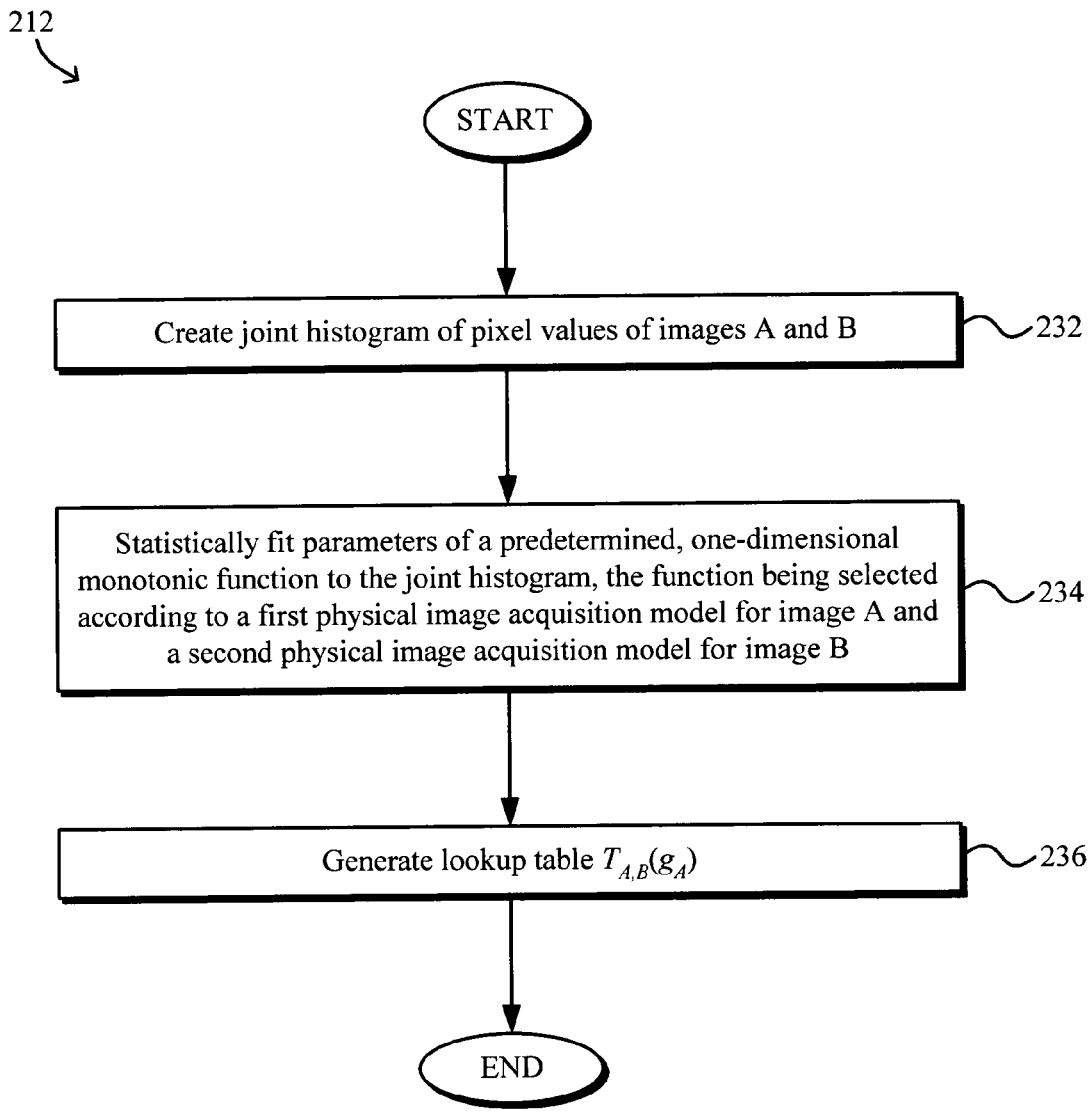
FIG. 3 is a flowchart illustrating a step of generating a transformation function $T_{A,B}(g_A)$ is more detail.

Step 212 of generating the transformation function $T_{A,B}(g_A)$ is illustrated in more detail in the flowchart of FIG. 3. In particular, the transformation function generation includes creating a joint histogram of images A and B at step 232. Various parameters of a predetermined, one-dimensional monotonic function are statistically fit to the joint histogram at step 234 using, for example, a least squares method. The predetermined, one-dimensional monotonic function is selected from one of a set of predetermined functions according to a physical acquisition model for image A and a physical acquisition model for image B. After the parameters are statistically fit to the joint histogram, the lookup table $T_{A,B}(g)$ is generated at step 236.

Figure 4:
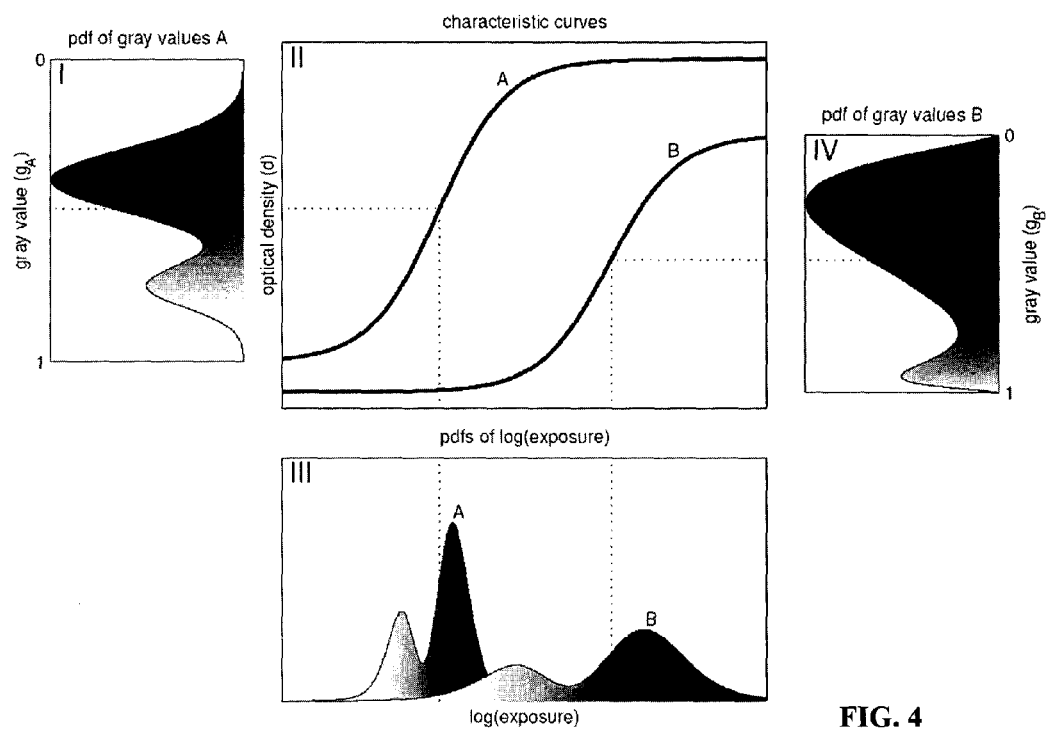
FIG. 4 shows four panels that illustrate the steps of image acquisition that are modeled in order for a screen-film mammography to go from one pixel value of Image A to the corresponding pixel value of Image B.

The process 212 of generating the transformation function $T_{A,B}(g_A)$ and the predetermined functions will be further explained with a more detailed discussion of the parametric modeling below. In particular, FIG. 4 shows four plots or panels that illustrate the steps of image acquisition that are modeled in order for a screen-film mammography to be transformed from a given pixel value of Image A (Panel I) to a corresponding pixel value of Image B (Panel IV). Panels I and IV illustrate the probability density functions (pdfs) of the gray values $g_A$, $g_B$ of image A and image B, respectively. Panel II illustrates the characteristic curves of the films for images A and B in which optical density, i.e., blackening of the film is plotted against log(exposure). Lastly, Panel III illustrates the probability density functions of log(exposure) for images A and B. Panel III gives an exaggerated transformation of log(exposure). The dotted lines show the paths of one illustrative pixel value for each of images A and B.

Figure 5:
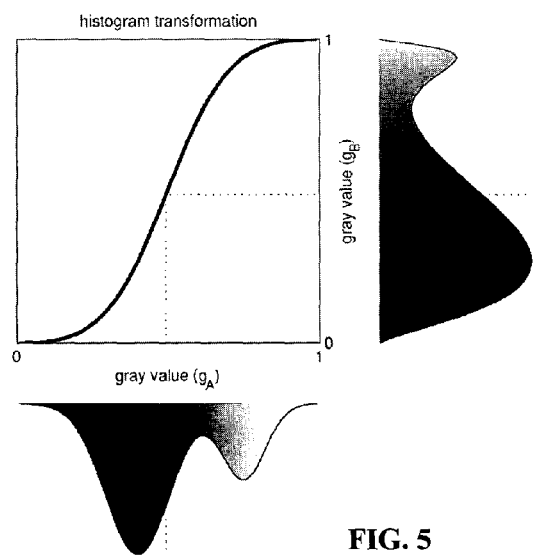
FIG. 5 shows a transformation between pixel values for two screen-film images A and B.

By combining the chain of events illustrated in the four panels of FIG. 4, an objective transformation between pixel values for the two screen-film images A and B is determined, as shown in FIG. 5. Many of the unknown acquisition parameters in the model are canceled out to result in a parametric model with fewer degrees of freedom which are estimated or fitted from the pixel value distributions of the two images themselves.

TABLE I

| | |
|---|---|
| r | location on image (2-vector) |
| b(r) | exposure |
| μ(r) | attenuation coefficient |
| v, φ | relative onset and size of digitization range |
| γ | linear response of full field digital mammography (FFDM): g = γb |
| od | optical density |
| $od_{min}$, $od_{max}$ | extrema of characteristic curve |

TABLE I-continued

| | |
|---|---|
| $\alpha, \beta$ | shift and slope of characteristic curve |
| $d_A(g_A)$ | pixel value distribution function of $g_A$ |
| $d_{A,B}(g_A, g_B)$ | joint pixel value distribution function of $g_A$, $g_B$ |
| $D_A(g_A)$ | cumulative pixel value distribution function of $g_A$ |
| $G_A$ | indexed pixel value |
| $g_A$ | normalized pixel value $\in [0, 1]$ |
| $g_A^{(P\%)}$ | P% quantile of $d_A(g_A)$ |
| $h(r)$ | breast thickness |
| $i_0, i(r)$ | incident and exiting radiation intensity |
| n | number of discrete pixel values |
| t | exposure time |
| $T_{A,B}(g_A)$ | model for look-up table |
| $\mu, \sigma$ | compound parameters |
| $\Delta h$ | compound parameter $\{h_B/h_A\}$ |
| $\Delta b_0$ | compound parameter $\left\{\ln(t_B i_{0,B}) - \dfrac{h_B}{h_A}\ln(t_A i_{0,A})\right\}$ |

For purposes of clarity, Table I lists various parameters used to describe the parametric modeling and their corresponding definitions. Pixel value distribution functions $d_A(g)$ and $d_B(g)$ can be derived from the pixel values of images A and B. Using the pixel value distribution functions $d_A(g)$ and $d_B(g)$, a lookup table or transformation function $T_{A,B}(g)$ is derived to map a pixel value in image A to a pixel value in image B. As is evident, a lookup table $T_{B,A}(g)$ in the reverse direction can be determined with similar modeling and methods.

The transformation lookup table $T_{A,B}(g)$ is determined so as to achieve similar cumulative pixel value distribution functions $D_A(g)$ and $D_B(g)$ for the images after the transformation. For image pairs without a global contrast reversal, i.e., analog to analog and digital to digital, the cumulative pixel value distribution functions $D_A(g)$ is given by:

$$D_A(g_A) = \int_{\gamma=0}^{g_A} d_A(\gamma)d\gamma \approx \int_{\gamma=0}^{g_B=T_{A,B}(G_A)} d_B(\gamma)d\gamma = D_B(g_B = T_{A,B}(g_A)). \quad (1)$$

For image pairs with a global contrast reversal, i.e., between analog and digital, the integration limits for the second integral in (1) are from $T_{A,B}(g_A)$ to the maximum pixel value and results in:

$$D_A(g_A) \approx 1 - D_B(g_B = T_{A,B}(g_A)). \quad (1A)$$

As noted above, conventional ad hoc methods exist that match two histograms, e.g., by shifting the overall brightness, i.e., $T_{A,B}(g) = g - g_0$, or by also changing the contrast, i.e., $T_{A,B}(g) = c(g - g_0)$. Such ad hoc methods are mostly independent of the way the images are obtained and are generally applied to normal photographs, infrared images, or any other kind of image pairs of the same modality. However, these conventional ad hoc methods are not well suited for histogram matching on a combination of a digital and an analog medical image such as a mammogram. Another conventional method is a non-parametric method that may be suited for histogram matching on a combination of a digital and an analog medical image such as a mammogram.

Parametric Modeling of Acquisition Parameters

The present parametric modeling takes into account some of the most relevant parameters in the acquisition that influence pixel value differences between images. The acquisition parameters include breast compression, exposure time, intensity of incident radiation, and either characteristic film curve and digitization for screen-film (analog) mammography or detector response for unprocessed digital mammography. The modeling of each of these acquisition parameters will now be described.

To model breast compression and intensity of incident radiation, a simple approximation can be used that takes exposure differences due to tissue thickness differences into account. In a model for mono-energetic X-rays, the intensity attenuation due to the breast tissue is related to breast thickness $h(r)$ by $i(r) = i_0 \exp(-\mu(r) h(r))$, where $i_0$ is the radiation intensity of the incident beam and $\mu(r)$ is the mean attenuation per unit of length for X-rays at location r. This relation is known as Beer's law. See, for example, Barrett, H. H., Swindell, W., "Radiological Imaging: the Theory of Image Formation, Detection, and Processing," Vol. I and II (1981), Academic Press, Inc. The exposure at location r on the film is obtained by multiplication of radiation intensity $i(r)$ by the exposure time t, i.e., $$b(r) = t i_0 \exp(-\mu(r)h(r)). \quad (2)$$

The relationship between the exposure in image A, $b_A(r)$, and the exposure in image B, $b_B(r)$, is obtained by assuming that the attenuation coefficient $\mu(r)$ remains constant for corresponding locations r of the images. It is further assumed that the breast thickness ratio $h_B(r)/h_A(r)$ does not depend on location r and is thus an unknown constant $\Delta h = h_B/h_A$. Because the breast is compressed between two parallel compression plates, this assumption is valid for at least the interior part of the breast if projection angle differences of X-rays are small. In addition, for the region near the breast edge where the breast bulges out, this assumption is reasonable because a proportional decrease of thickness will occur in both images. After the attenuation coefficient $\mu_A(r)$ is equated to attenuation coefficient $\mu_B(r)$, the following linear relation is obtained:

$$\ln b_B(r) = \frac{h_B}{h_A}\ln b_A(r) + \ln(t_B i_{0,B}) - \frac{h_B}{h_A}\ln(t_A i_{0,A}) = \Delta h \ln b_A(r) + \Delta b_0. \quad (3)$$

where breast thickness ratio $h_B/h_A$ is the unknown constant $\Delta h$ and $\ln(t_B i_{0,B}) - (h_B/h_A)(\ln(t_A i_{0,A}))$ is an unknown constant $\Delta b_0$. Where the acquisition settings for the two images are similar, i.e., $\Delta h \approx 1$ and $\Delta b_0 \approx 0$, the relationship between the exposure in images A and B is approximately equal, i.e., $b_A \approx b_A$. The two unknown constants $\Delta h$ and $\Delta b_0$ will be absorbed in subsequent steps in developing the transformation model.

As noted above, for screen-film mammography, the parametric modeling also takes into account characteristic film curve and digitization as these are also some of the most relevant parameters in the acquisition that influence pixel value differences between images. The characteristic curve, also referred to as the HD-curve after Hurter and Driffeld (see Hurter, F. & Driffeld, V. C.: Photo-chemical investigations and a new method of the sensitiveness of photographic plates, The Journal of the Society of Chemical Industry (1890) 455-469), gives the relationship between the log (exposure), i.e., log b(r), and the corresponding optical density, od, after development of the film. This relationship, i.e., the characteristic film curve, is illustrated in and described above with reference to Panel II of FIG. 4. The logistic function is used as a model for the characteristic film curve:

$$od(b) = od_{min} + \frac{od_{max} - od_{min}}{1 + e^{-\beta \ln(b - \alpha)}}. \quad (4)$$

Figure 6:
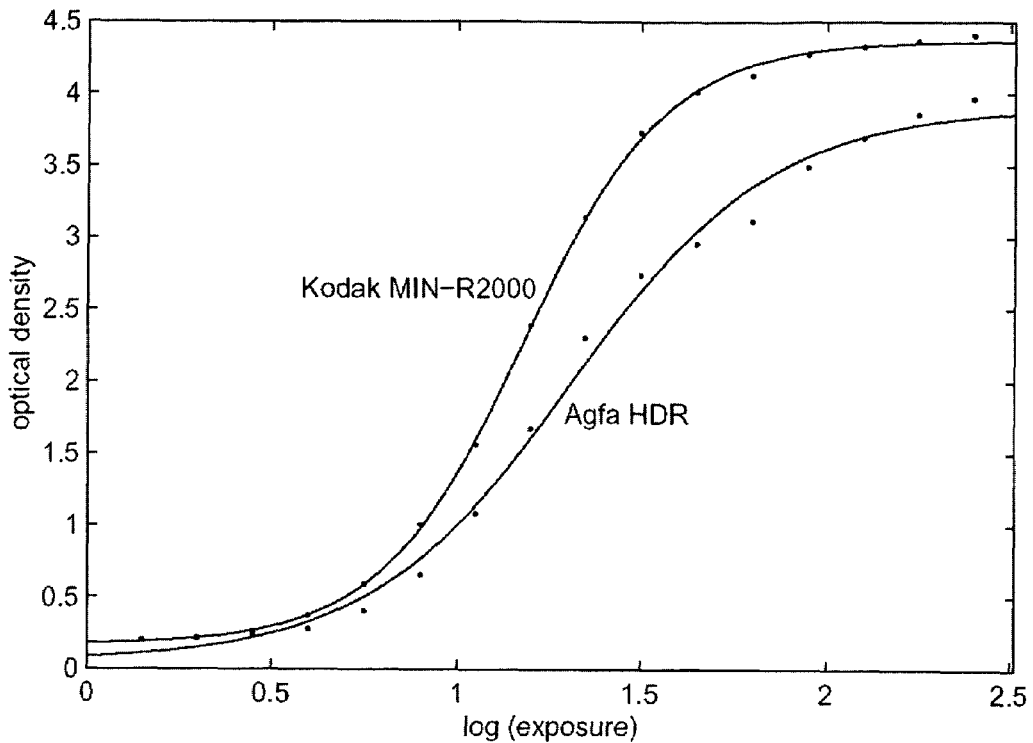
FIG. 6 shows empirically obtained sensitometric curves (characteristic curves) for two illustrative types of film.

Illustrative empirically obtained sensitometric or characteristic curves are shown in FIG. 6 merely as examples. In particular, FIG. 6 shows empirically obtained sensitometric curves for two illustrative types of film, i.e., KODAK MIN-R2000 and AGFA HDR along with their best fitting (least squares) logistic functions.

In digitization of the analog image, it is assumed that the relationship between optical densities, od, and pixel values, G, is linear (for n-bits digitization: $0 \leq G \leq 2^n - 1$). Some digitizers produce pixel values that have an exponential relation with optical density, i.e., a linear relation with luminance. However, after converting the pixel values to a linear relation with optical densities, the following equations are still valid. For convenience, the digitization range is defined relative to the dynamic range of the characteristic curve, i.e., relative to the range $od_{min}$ to $od_{max}$. $\{od_{min}+v(od_{max}-od_{min})\}$ is defined as the maximum value of the optical density that is digitized, i.e., with the minimum pixel value, and $\{od_{min}+(v-\phi)(od_{max}-od_{min})\}$ is defined as the minimum value of the optical density that is digitized, i.e., with the maximum pixel value. Parameters v and $\phi$ are defined as the relative onset and size of digitization image, respectively and are larger than zero. If the dynamic range of the characteristic curve is precisely digitized then $v=\phi=1$. The linear relation between normalized pixel values, g, and optical densities, od, is given by $$g(od) = \frac{G}{2^n - 1} = \frac{1}{\phi}\left(v - \frac{od - od_{min}}{od_{max} - od_{min}}\right) \in [0, 1]. \quad (5)$$

Substituting (4) into (5) cancels out the dynamic range parameters, $od_{min}$ and $od_{max}$ and gives the combined film-digitizer characteristic curve as:

$$g(b) = \frac{1}{\phi}\left(v - \frac{1}{1 + e^{-\beta(\ln b - \alpha)}}\right). \quad (6)$$

By incorporating digitization ranges, some pixel values may be invalid in the model. All pixel values with $v-g\phi \in [0,1]$ correspond to optical densities in the dynamic range of the characteristic curve while all other pixel values, i.e., $v-g\phi<0$ or $v-g\phi>1$ should not exist. If $v-\phi>0$ or $v<1$ then less than the entire dynamic range of the characteristic curve is digitized. In such cases, the clipping of large and/or small pixel values is preferably taken into account.

For digital mammography, as noted above, the parametric modeling also takes into account the detector response as it is another one of the most relevant parameters in the acquisition that influences pixel value differences between images. For digital mammography, the relationship between exposure b and pixel value g is approximately linear for a wide exposure range and is given by:

$$g(b) = \frac{G}{2^n - 1} = \gamma b \in [0, 1]. \quad (7)$$

The above-described models for modeling some of the most relevant parameters in the image acquisition that influence pixel value differences between images are summarized in TABLE II. As noted, the acquisition parameters include breast compression, exposure time, intensity of incident radiation, and either characteristic film curve and digitization for screen-film (analog) mammography or detector response for unprocessed digital mammography.

TABLE II

| Model | | Acquisition Parameters Modeled |
|---|---|---|
| $\ln b_B(r) = \Delta h \ln b_A(r) + \Delta b_0.$ | (3) | Breast compression, incident radiation intensity, exposure time. |
| $g(b) = \frac{1}{\phi}\left(v - \frac{1}{1 + e^{-\beta(\ln b - \alpha)}}\right).$ | (6) | Combined film and digitizer characteristic curve. |
| $g(b) = \frac{G}{2^n - 1} = \gamma b \in [0, 1].$ | (7) | digital detector response. |

Parametric Equations for Combinations of Analog and Digital Images

With the parametric models of the image acquisition parameters as summarized in TABLE II, the parametric equations for transformation between various combinations of analog and digital images can be derived. The four combinations are analog to analog, digital to digital, digital to analog and analog to digital.

For analog to analog image registration, parametric models (3) (compression-time-intensity function) and (6) (combined film-digitizer characteristic curve) are combined to derive the transformation function for two screen-film Images A and B:

$$g_B = T_{A,B}(g_A) = \frac{1}{\phi_B}\left(v_B - \frac{1}{1 + \lambda\left(\frac{1}{v_A - \phi_A g_A} - 1\right)^\sigma}\right), \quad (8)$$

where the parameters $\lambda$ and $\sigma$ are compound parameters that contain previously defined acquisition parameters and are given by:

$$\begin{cases} \lambda = e^{-\beta_B(\Delta h \alpha_A + \Delta b_0 - \alpha_B)}; \\ \sigma = \frac{\beta_B}{\beta_A}\Delta h. \end{cases}$$

Figure 7:
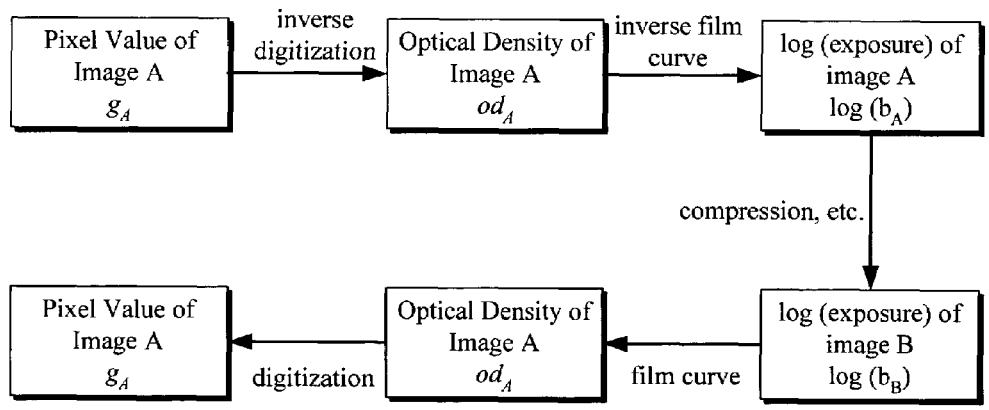
FIG. 7 is a flow diagram illustrating steps for determining a histogram transformation between two screen-film mammograms.

Note that if the acquisition settings for images A and B are comparable, then $\lambda \approx 1$, $\sigma \approx 1$, $v_A \approx v_B$ and $\phi_A \approx \phi_B$ such that $g_A \approx g_B$. The flow diagram of FIG. 7 illustrates the steps for determining a transformation function between two screen-film mammograms.

Similarly, for the digital to digital transformation function, parametric models (3) and (7) (digital exposure-pixel value function) are combined to derive the transform function for two digital Images A and B:

$$g_B = T_{A,B}(g_A) = \lambda g_A^\sigma, \quad (9)$$

where the compound parameters $\lambda$ and $\sigma$ are given by:

$$\begin{cases} \lambda = \gamma_A^{-1/\Delta h} \gamma_B e^{-\Delta b_0/\Delta h}; \\ \sigma = \frac{1}{\Delta h}. \end{cases}$$

For the digital to analog transform function, parametric models (3), (6) and (7) are combined to derive the transform function:

$$g_B = T_{A,B}(g_A) = \frac{1}{\phi_B}\left(v_B - \frac{1}{1+\lambda g_A^\sigma}\right), \quad (10)$$

where the compound parameters $\lambda$ and $\sigma$ are given by:

$$\begin{cases} \lambda = \gamma_A^{\Delta h \beta_B} e^{-\beta_B(\Delta b_0 - \alpha_B)}; \\ \sigma = -\Delta h \beta_B. \end{cases}$$

Lastly, for the analog to digital histogram transformation function, parametric models (3), (6) and (7) are combined to derive the transform function:

$$g_B = T_{A,B}(g_A) = \lambda\left(\frac{1}{v_A + \phi_A g_A} - 1\right)^\sigma. \quad (11)$$

where the compound parameters $\lambda$ and $\sigma$ are given by:

$$\begin{cases} \lambda = \gamma_B e^{\Delta h \alpha_A + \Delta b_0}; \\ \sigma = -\frac{\Delta h}{\beta_A}. \end{cases}$$

Figure 8:
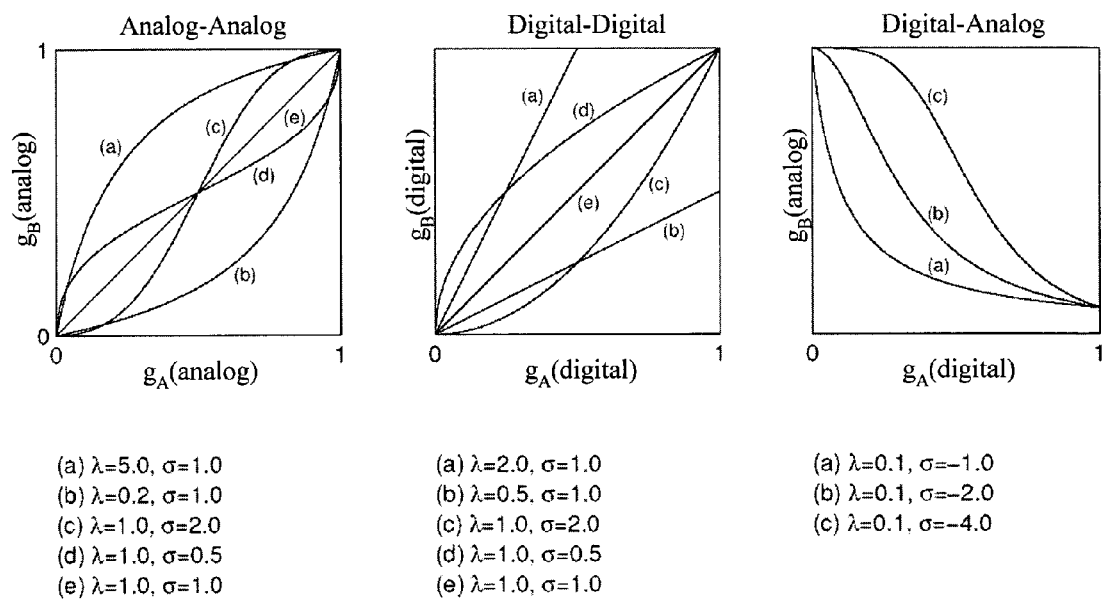
FIG. 8 are plots for illustrative transformations for some parameter values.

Table III below summarizes the transform functions and the parameters for each of the four cases. Although the same symbols $\lambda$ and $\sigma$ are used in the four parametric models, their meaning and valid ranges differ. In addition, although compound parameters $\lambda$ and $\sigma$ are defined for each of the four cases above, $\lambda$ and $\sigma$ are preferably treated as individual parameters in the histogram matching process. In addition, as noted above, for screen-film images, these relationships are valid when the pixel values correspond to optical densities in the dynamic range of the characteristic curve, i.e., when $0 \leq v - \phi g \leq 1$, otherwise clipping of pixel values takes place. FIG. 8 are plots for some illustrative transformations for a few parameter values. Specifically, FIG. 8 illustrates the transformations between two analog images (based on (8)), transformations between two digital images (based on (9)) and transformations between a digital image and an analog image (based on (10)). In each plot involving an analog image, the full dynamic range of the characteristic curves is digitized for analog images, i.e., $v = \phi = 1$.

Fitting Parameters to Parametric Model: Restricted or Entire Model

With the above four predetermined parametric models for the various combinations of analog and digital image transformations, histogram matching may be performed by selecting one of the four predetermined models based on the image acquisition (digital or analog) for each of the two images and estimating or otherwise fitting the values of the parameters for the appropriate model. The histogram matching may be performed using (1) restricted parametric model in which only the dynamic range of the characteristic curve is digitized (i.e., $v_A = \phi_A = v_B = \phi_B = 1$ and only estimate $\lambda, \sigma$), e.g., FIG. 7, or (2) the entire parametric model.

In the case of histogram matching using the restricted parametric model, the estimates of $\lambda$, $\sigma$ can be used as a first guess for an iterative process. It is noted that if the digitizer calibration and the minimum and maximum optical density of the screen-film system are known, pixel values can be rescaled before processing.

To estimate the two unknown parameters $\lambda$ and $\sigma$, (1) is used to require that the parameters $\lambda$ and $\sigma$ are set to simultaneously fulfill two quantiles. For example, the 25% and 75% percentiles may be selected as the desired quantiles such that the following pair of equations would need to be satisfied:

$$\begin{cases} g_B^{(25\%)} = T_{A,B}(g_A^{(25\%)}); \\ g_B^{(75\%)} = T_{A,B}(g_A^{(75\%)}). \end{cases} \quad (12)$$

The 25% and 75% percentiles are merely illustrative quantiles and any suitable combination of non-equal quantiles may be employed. In case of a transformation between analog and digital images, the cumulative distribution function (cdf) of one image is preferably inverted before the quantiles are determined to account for the opposite sign in contrasts (see (1A)). Hence, $g_B^{(P\%)} \to g_B^{(100\%-P\%)}$.

With $v_A = \phi_A = v_B = \phi_B = 1$, all four transformations can be rewritten as shown in Table IV.

TABLE IV

| Transformation | Transform function | |
|---|---|---|
| analog → analog | $\dfrac{g_B}{1-g_B} = \lambda\left(\dfrac{g_A}{1-g_A}\right)^\sigma$ | (derived from (8)) |
| digital → digital | $g_B = \lambda g_A^\sigma$ | (derived from (9)) |

TABLE III

| Transformation | Transform function | | Parameters |
|---|---|---|---|
| analog → analog | $g_B = T_{A,B}(g_A) = \dfrac{1}{\phi_B}\left(v_B - \dfrac{1}{1+\lambda\left(\dfrac{1}{v_A-\phi_A g_A}-1\right)^\sigma}\right)$ | (8) | $\phi_A, \phi_B, v_A, v_B, \lambda, \sigma$ |
| digital → digital | $g_B = T_{A,B}(g_A) = \lambda g_A^\sigma$ | (9) | $\lambda, \sigma$ |
| digital → analog | $g_B = T_{A,B}(g_A) = \dfrac{1}{\phi_B}\left(v_B - \dfrac{1}{1+\lambda g_A^\sigma}\right)$ | (10) | $\phi_B, v_B, \lambda, \sigma$ |
| analog → digital | $g_B = T_{A,B}(g_A) = \lambda\left(\dfrac{1}{v_A+\phi_A g_A}-1\right)^\sigma$ | (11) | $\lambda, \sigma, v_A, \phi_A$ |

TABLE IV-continued

| Transformation | Transform function | |
|---|---|---|
| digital → analog | $\dfrac{g_B}{1-g_B} = \lambda g_A^\sigma$ | (derived from (10)) |
| analog → digital | $g_B = \lambda \left(\dfrac{g_A}{1-g_A}\right)^\sigma$ | (derived from (11)) |

By substituting monotonically increasing functions (omitting the subscripts A and B and superscripts (25%) and (75%) for purposes of clarity):

$$\xi = \ln\left(\frac{g}{1-g}\right) \quad \text{for analog images;} \tag{13}$$

$$\xi = \ln(g) \quad \text{for digital images,}$$

the general solution of (12) for all four transformations is given by $$\begin{cases} \lambda = \exp\left(\left(\dfrac{\xi_B^{(25\%)} \xi_A^{(75\%)} - \xi_A^{(25\%)} \xi_B^{(75\%)}}{\xi_A^{(75\%)} - \xi_A^{(25\%)}}\right)\right); \\ \sigma = \dfrac{\xi_B^{(75\%)} - \xi_B^{(25\%)}}{\xi_A^{(75\%)} - \xi_A^{(25\%)}}. \end{cases} \tag{14}$$

Alternatively, the histogram matching may be performed using the entire parametric model. Although histogram matching is typically a one-dimensional process and that a one-dimensional lookup table is generated, the development of the lookup table is based on a two-dimensional joint distribution of pixel value pairs of images A and B.

Ideally, the joint distribution of pixel value pairs would have all its mass on a one-dimensional curve after geometric registration and this one-dimensional curve would be a monotonically increasing (or decreasing) function, resulting from (1). The one-dimensional curve describes the transformation $(g_A, T_{A,B}(g_A))$. In the ideal case, histogram matching is thus a one-dimensional process. In practice, however, the joint distribution has scattered mass around the ideal curve. This may be due to, for example, errors in geometric registration and/or physical changes that occurred between the times that the mammograms are taken.

If the geometric registration is reliable then the parametric models of (8) to (11) can be fitted to the distribution of pixel value pairs. Thus, histogram matching using the entire parametric model imposes greater demands on the quality of geometric registration than in the case of histogram matching using the restricted parametric model. Geometric registration was only used in the restricted parametric model to define the regions of overlap between the images and it was presumed that within these regions tuples of pixels can be registered in principle but that the tuples themselves were not explicitly needed. Using the entire parametric model, the joint distribution of pixel value pairs is used to fit the model and thus a more precise registration is needed. Although in the geometric registration only affine transformations are used, the joint distribution of pixel values is generally precise enough for fitting the parametric model. Better results can be obtained, however, when non-rigid registration of the images is employed.

Histogram matching using the entire parametric model is achieved as follows. After geometric registration, a two-dimensional distribution, $d_{A,B}(g_A, g_B)$, is constructed by sampling pixel values $g_A$ and $g_B$ of the registered pixels. The appropriate transformation function $T_{A,B}(g_A)$ (selected from (8) to (11)) is subsequently fitted to this distribution by minimizing the sum of squared errors:

$$\underset{\text{parameters}}{\text{arg min}} \text{ of } T_{A,B} \sum_{g_A} \sum_{g_B} d_{A,B}(g_A, g_B)(g_B - T_{A,B}(g_A))^2. \tag{15}$$

This requires an iterative optimization routine, in which the results of histogram matching using the restricted parametric model are preferably used as a first guess for the values of the parameters.

Figure 9:
FIG. 9 are illustrative results for a digital to analog transformation.
Figure 9:
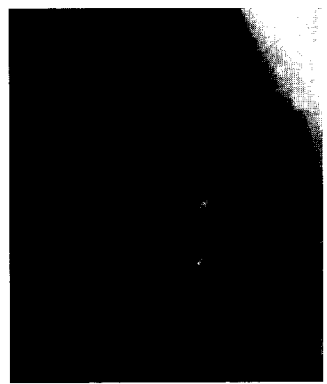
Figure 9:
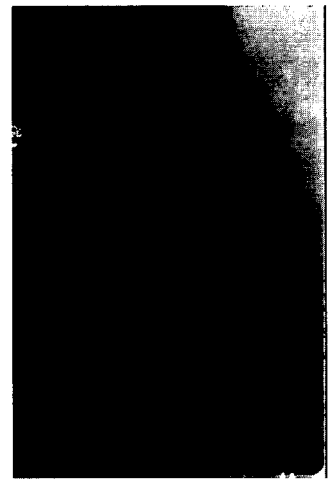
Figure 10:
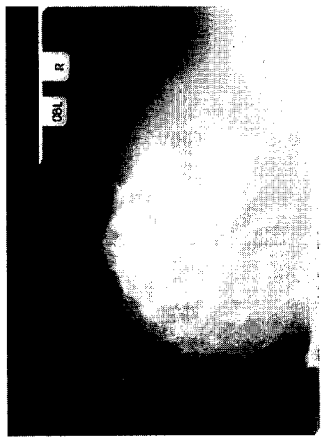
FIG. 10 are illustrative results for an analog to analog transformation.
Figure 10:
Figure 10:

FIG. 8 are plots for some illustrative transformations for a few parameter values. Illustrative results for a digital to analog transformation are shown in FIG. 9 and those for an analog to analog transformation are shown in FIG. 10. In each of FIGS. 9 and 10, the image on the left is an image to be mapped and the image on the right is the image to which the left image is to be mapped. The middle image is the resulting registered or mapped image of the left image. In particular, FIG. 9 illustrates the transformation of an unprocessed digital image (left) to a screen-film image made at the same day (right). FIG. 10 illustrates the transformation between two screen-film images (made with an interval of two years in between).

Figure 11:
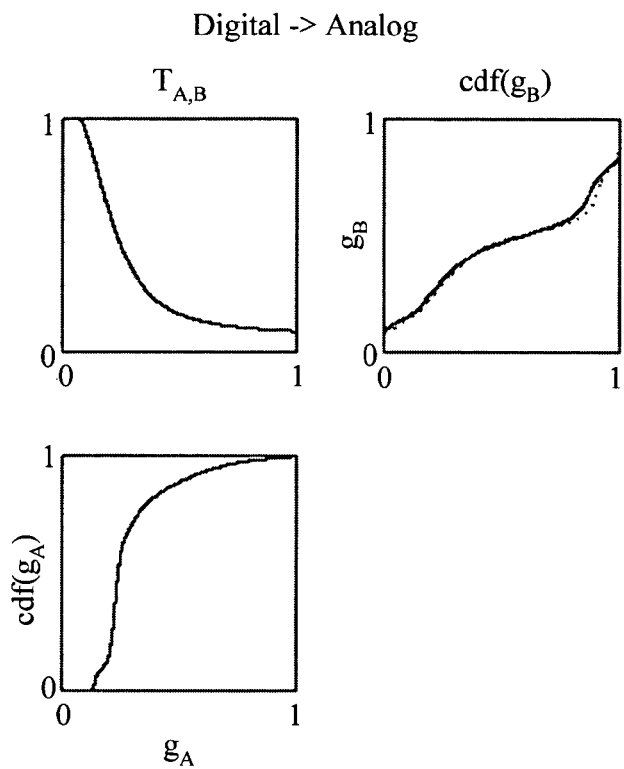
FIGS. 11 and 12 show the transformation curves $T_{A,B}$ and the cumulative distribution functions $cdf(g_B)$ for the examples of FIGS. 9 and 10, respectively.
Figure 12:
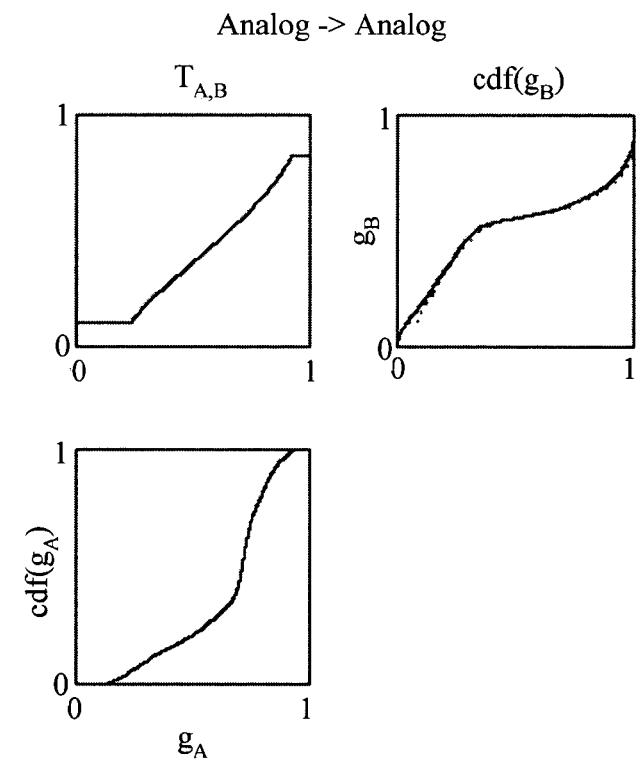

FIGS. 11 and 12 show the transformation curves $T_{A,B}$ and the cumulative distribution functions $cdf(g_B)$ for the examples of FIGS. 9 and 10, respectively. In particular, FIGS. 11 and 12 each illustrates the cumulative distribution function (cdf) of image A in the lower left while the cdf of image B are shown in the upper right. The dotted line is the cdf of the transformed Image A. The transformations $T_{A,B}$ are shown in the upper left.

Figure 13A:
Figure 13B:
Figure 13C:
Figure 13D:

As further examples, FIGS. 13A-13D illustrate an analog to digital transformation while FIGS. 14A-14D illustrate an analog to analog transformation. FIGS. 13A and 13B are input images A and B, respectively. FIG. 13C shows image C which is the result of mapping image B (FIG. 13B) to image A (FIG. 13A). FIG. 13D contains the scatter plot of pixel-values together with a plot of the fitted parametric model. Note that in this example, the analog image is mapped to the digital image. The gray-values in FIG. 13D are proportional to log(pixel value pair counts). Note also that log-transformed pixel values are used in the scatter plot of FIG. 13D instead of the original pixel values. As a final step, based on artificial automatic exposure control, a look-up table was designed so as to display the digital image and the transformed analog image in a conventional manner. The pixel-pair counts in FIG. 13D are determined prior to this final step.

Figure 14A:
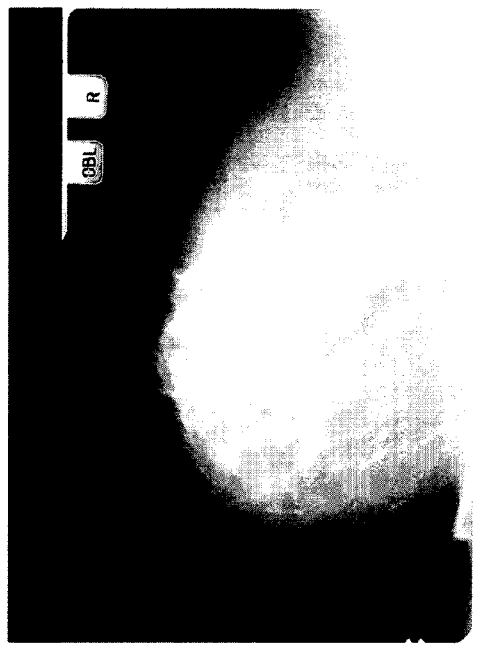
Figure 14B:
Figure 14C:
Figure 14D:

Similarly, FIGS. 14A and 14B are input images A and B, respectively. FIG. 14C shows image C which is the result of mapping image B (FIG. 14B) to image A (FIG. 14A). FIG. 14D contains the scatter plot of pixel-values together with a plot of the fitted parametric model. The gray-values in FIG. 14D are proportional to log(pixel value pair counts).

As is evident, the parameter-based method for grayscale registration of one image to another image uses only information in those images and the image acquisition method of each image. The image acquisition method of each image is used in order to select the appropriate parametric transform model from a set of predetermined parametric transform models. The method includes spatially registering the two images and performing gray scale registration. The gray scale registration involves generating a transform lookup table and using the transform lookup table to transform and register pixel values of one image to the pixel values of the other image. To generate the transform lookup table, a joint histogram may be generated from the two images and parameters of the predetermined parametric transform model are statistically fit to the joint histogram.

The various acquisition models described herein take into account many of the most relevant steps in the image acquisition that influence pixel value differences between images. The parameter-based model provides a transform function or lookup table $T_{A,B}(g_A)$ to transform or register pixel values in one image to those on another image. The methods are particularly suited for temporal comparisons of medical images such as mammograms. In addition, the transformation great facilitates comparison of analog with digital images, i.e., combinations of unprocessed digital and digitized film-based mammograms by a radiologist. The method is based on a model of acquisition, which makes it relatively unsusceptible to differences between the images that are not due to acquisition, while other differences do not greatly affect the quality of transformed images negatively.

The method enables a radiologist to make quick, effective and efficient temporal comparisons of medical images and thus requiring fewer manual and subjective adjustments to be made by the radiologist for optimal display of the mammograms. In addition or alternative to image display, the transformation method may also be used for computer aided detection methods that make use of temporal or other comparative information.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method implemented by a computing device comprising at least one processor and memory for grayscale registration of a first medical image and a second medical image, the method comprising:

spatially registering, by the computing device, the first medical image and the second medical image relative to each other;

generating, by the computing device, at least one joint pixel value histogram based on pixel values of the first and second medical images;

generating, by the computing device, a lookup table based at least in part on the at least one joint pixel value histogram, a first image acquisition method for the first medical image and a second image acquisition method for the second medical image; and applying, by the computing device, the lookup table to the pixel values of the first medical image to generate a third medical image, the third medical image being transformed from the first medical image and registered to the second medical image;

wherein the step of generating the lookup table includes:

selecting a parametric transform function from a plurality of predetermined, parametric transform functions based on the first and second medical image acquisition methods for the first and second medical images, respectively; and statistically fitting parameters of the selected parametric transform function to the at least one pixel value histogram, the statistically fitting determines values of the parameters, wherein the lookup table is generated using the selected parametric transform function and the values of the fitted parameters;

and wherein each of the first and second medical images is one of a digitized analog image and a digitally acquired image and wherein the plurality of predetermined parametric transform functions includes: (1) a function for registering a digitized analog image to another digitized analog image, (2) a function for registering a digitally acquired image to another digitally acquired image, (3) a function for registering a digitally acquired image to a digitized analog image, and (4) a function for registering a digitized analog image to a digitally acquired image.

2. The method of claim 1, wherein the plurality of predetermined parametric transform functions are one-dimensional monotonic functions.

3. The method of claim 1, wherein each of the plurality of predetermined parametric transform functions models image acquisition parameters, the image acquisition parameters being at least one of incident radiation intensity, exposure time, film characteristic curve for an analog image, digitizer characteristic for digitizing an analog image, and digital detector response for a digitally acquired image.

4. The method of claim 1, wherein each of the first and second medical images is a mammogram, and wherein each of the plurality of predetermined parametric transform functions models image acquisition parameters, the image acquisition parameters being at least one of breast thickness, incident radiation intensity, exposure time, film characteristic curve for an analog image, digitizer characteristic for digitizing an analog image, and digital detector response for a digitally acquired image.

5. The method of claim 1, further comprising the steps of:
performing computer aided detection process for comparing the second and third medical images; and
displaying the second and third medical images with results of said computer aided detection process.

6. The method of claim 1, wherein spatially registering the first and second medical images includes at least one of translating, rotating, shearing and scaling at least one of the first and second medical images.

7. The method of claim 1, wherein each of the first and second medical images includes a target portion and a remainder portion and wherein spatially registering the first and second medical images includes segmenting the target portion and the remainder portion of each of the first and second medical images.

8. The method of claim 1, wherein each of the first and second medical images includes a target portion and a remainder portion and wherein spatially registering the first and second medical images includes cropping each of the first and second medical images to contain only the target portion that is in both the first and second medical images.

9. The method of claim 8, wherein the at least one pixel value histogram is generated based on pixel values of only the cropped first and second medical images.

10. The method of claim 1, wherein spatially registering the first and second medical images includes optimization of an entropy correlation coefficient of the first and second medical images.

11. A method implemented by a computing device comprising at least one processor and memory for registering a first medical image to a second medical image, the method comprising:

generating, by the computing device, a joint pixel value histogram using pixel values of the first and second medical images;

selecting, by the computing device, a parametric transform function from a plurality of predetermined parametric transform functions, the selecting being based on a first medical image acquisition method for the first medical image and a second medical image acquisition method for the second medical image; and statistically fitting, by the computing device, parameters of the selected parametric transform function to the joint pixel value histogram, the statistically fitting determining values of the parameters;

wherein each of the first and second medical images is one of a digitized analog image and a digitally acquired image and wherein the plurality of predetermined parametric transform functions includes: (1) a function for registering a digitized analog image to another digitized analog image, (2) a function for registering a digitally acquired image to another digitally acquired image, (3) a function for registering a digitally acquired image to a digitized analog image, and (4) a function for registering a digitized analog image to a digitally acquired image.

12. The method of claim 11, further comprising:

generating a lookup table using the selected parametric transform function and the values of the fitted parameters; and applying the lookup table to the pixel values of the first medical image to generate a third medical image, the third medical image being transformed from the first medical image and registered to the second medical image.

13. The method of claim 11, further comprising the steps of:

performing computer aided detection process for comparing the second and third medical images; and displaying the second and third medical images with results of said computer aided detection process.

14. The method of claim 11, wherein the plurality of predetermined parametric transform functions are one-dimensional monotonic functions.

15. The method of claim 11, wherein each of the plurality of predetermined parametric transform functions models image acquisition parameters, the image acquisition parameters being at least one of incident radiation intensity, exposure time, film characteristic curve for an analog image, digitizer characteristic for digitizing an analog image, and digital detector response for a digitally acquired image.

16. The method of claim 11, wherein each of the first and second medical images is a mammogram, and wherein each of the plurality of predetermined parametric transform functions models image acquisition parameters, the image acquisition parameters being at least one of breast thickness, incident radiation intensity, exposure time, film characteristic curve for an analog image, digitizer characteristic for digitizing an analog image, and digital detector response for a digitally acquired image.

17. The method of claim 11, further comprising spatially registering the first medical image and the second medical image relative to each other.

18. The method of claim 17, wherein spatially registering the first and second medical images includes at least one of translating, rotating, shearing and scaling at least one of the first and second medical images.

19. The method of claim 17, wherein each of the first and second medical images includes a target portion and a remainder portion and wherein spatially registering the first and second medical images includes segmenting the target portion and the remainder portion of each of the first and second medical images.

20. The method of claim 17, wherein each of the first and second medical images includes a target portion and a remainder portion and wherein spatially registering the first and second medical images includes cropping each of the first and second medical images to contain only the target portion that is in both the first and second medical images.

21. The method of claim 20, wherein the joint pixel value histogram is genera ted based on pixel values of only the cropped first and second medical images.

22. The method of claim 17, wherein spatially registering the first and second medical images includes optimization of an entropy correlation coefficient of the medical images.

23. A system for registering a first medical image to a second medical image, comprising:

an input for receiving data for the first and second medical images; and a processor generating a joint pixel value histogram using pixel values of the first and second medical images, selecting a parametric transform function from a plurality of predetermined parametric transform functions based on a first image acquisition method for the first medical image and a second image acquisition method for the second medical image, and statistically fitting parameters of the selected parametric transform function to the joint histogram to determine the values of the parameters;

wherein each of the first and second medical images is one of a digitized analog image and a digitally acquired image, and wherein the plurality of predetermined parametric transform functions includes: (1) a function for registering a digitized analog image to another digitized analog image, (2) a function for registering a digitally acquired image to another digitally acquired image, (3) a function for registering a digitally acquired image to a digitized analog image, and (4) a function for registering a digitized analog image to a digitally acquired image.

24. The system of claim 23, the processor further generating a lookup table using the selected parametric transform function and the values of the fitted parameters and applying the lookup table to the pixel values of the first medical image to generate a third medical image, the third medical image being transformed from the first medical image and registered to the second medical image.

25. The system of claim 23, the processor further performing a computer aided detection process for comparing the second and third medical images, the system further comprising:

a display for displaying the second and third medical images with results of the computer aided detection process.

26. The system of claim 23, wherein the plurality of predetermined parametric transform functions are one-dimensional monotonic functions.

27. The system of claim 23, wherein each of the plurality of predetermined parametric transform functions models image acquisition parameters, the image acquisition parameters being at least one of incident radiation intensity, exposure time, film characteristic curve for an analog image, digitizer characteristic for digitizing an analog image, and digital detector response for a digitally acquired image.

28. The system of claim 23, the processor further spatially registering the first medical image and the second medical image relative to each other.

29. The system of claim 28, the processor further spatially registering the first and second medical images by at least one of translating, rotating, shearing and scaling at least one of the first and second medical images.

30. The system of claim 28, wherein each of the first and second medical image includes a target portion and a remainder portion and wherein the processor spatially registers the first and second medical images by segmenting the target portion and the remainder portion of each of the first and second medical images.

31. The system of claim 28, wherein each of the first and second medical images includes a target portion and a remainder portion and wherein the processor further crops each of the first and second medical images to contain only the target portion that is in both the first and second medical images.

32. The system of claim 31, the processor further generating the joint pixel value histogram based on pixel values of only the cropped first and second medical images.

33. The system of claim 28, the processor further spatially registering the first and second medical images by optimizing an entropy correlation coefficient of the first and second medical images.

34. A tangible computer readable storage medium embodied with a computer program product such that when executed directs a computing apparatus to automatically register a first medical image and a second medical image, comprising:
   computer code for generating a joint pixel value histogram using pixel values of the first and second medical images;
   computer code for selecting a parametric transform function from a plurality of predetermined parametric transform functions, the selecting being based on a first image acquisition method for the first medical image and a second image acquisition method for the second medical image; and
   computer code for statistically fitting parameters of the selected parametric transform function to the joint pixel value histogram, the statistically fitting determines values of the parameters, wherein each of the first and second medical images is one of a digitized analog image and a digitally acquired image and wherein the plurality of predetermined parametric transform functions includes: (1) a function for registering a digitized analog image to another digitized analog image, (2) a function for registering a digitally acquired image to another digitally acquired image, (3) a function for registering a digitally acquired image to a digitized analog image, and (4) a function for registering a digitized analog image to a digitally acquired image.

35. A tangible computer readable storage medium embodied with a computer program product such that when executed directs a computing apparatus to automatically register a first medical image and a second medical image, comprising:
   computer code for spatially registering the first medical image and the second medical image relative to each other;
   computer code for generating at least one joint pixel value histogram based on pixel values of the first and second medical images;
   computer code for generating a lookup table based on the at least one joint pixel value histogram, a first image acquisition method for the first medical image and a second image acquisition method for the second medical image; and
   computer code for applying the lookup table to the pixel values of the first medical image to generate a third medical image, the third medical image being transformed from the first medical image and registered to the second medical image;
   wherein the computer code for generating the lookup table includes:
      computer code for selecting a parametric transform function from a plurality of predetermined, parametric transform functions based on the first and second medical image acquisition methods for the first and second medical images, respectively; and
      computer code for statistically fitting parameters of the selected parametric transform function to the at least one pixel value histogram, the statistically fitting determines values of the parameters, wherein the lookup table is generated using the selected parametric transform function and the values of the fitted parameters;
   wherein each of the first and second medical images is one of a digitized analog image and a digitally acquired image, and wherein the plurality of predetermined parametric transform functions includes: (1) a function for registering a digitized analog image to another digitized analog image, (2) a function for registering a digitally acquired image to another digitally acquired image, (3) a function for registering a digitally acquired image to a digitized analog image, and (4) a function for registering a digitized analog image to a digitally acquired image.

* * * * *

UNITED STATES PATENT AND TRADEMARK OFFICE
CERTIFICATE OF CORRECTION

PATENT NO. : 7,668,358 B2
APPLICATION NO. : 10/623191
DATED : February 23, 2010
INVENTOR(S) : Peter R. Snoeren et al.

It is certified that error appears in the above-identified patent and that said Letters Patent is hereby corrected as shown below:

Col. 22, Line 8: Delete "genera ted" and insert --generated-- therefor.
(Claim 21, Line 2)

Signed and Sealed this

First Day of June, 2010

David J. Kappos
*Director of the United States Patent and Trademark Office*